Oct. 20, 1953   M. A. C. ALAMAGNY   2,656,214
AUTOMOBILE BODY HAVING PIVOTED END SECTIONS
Filed Oct. 5, 1945
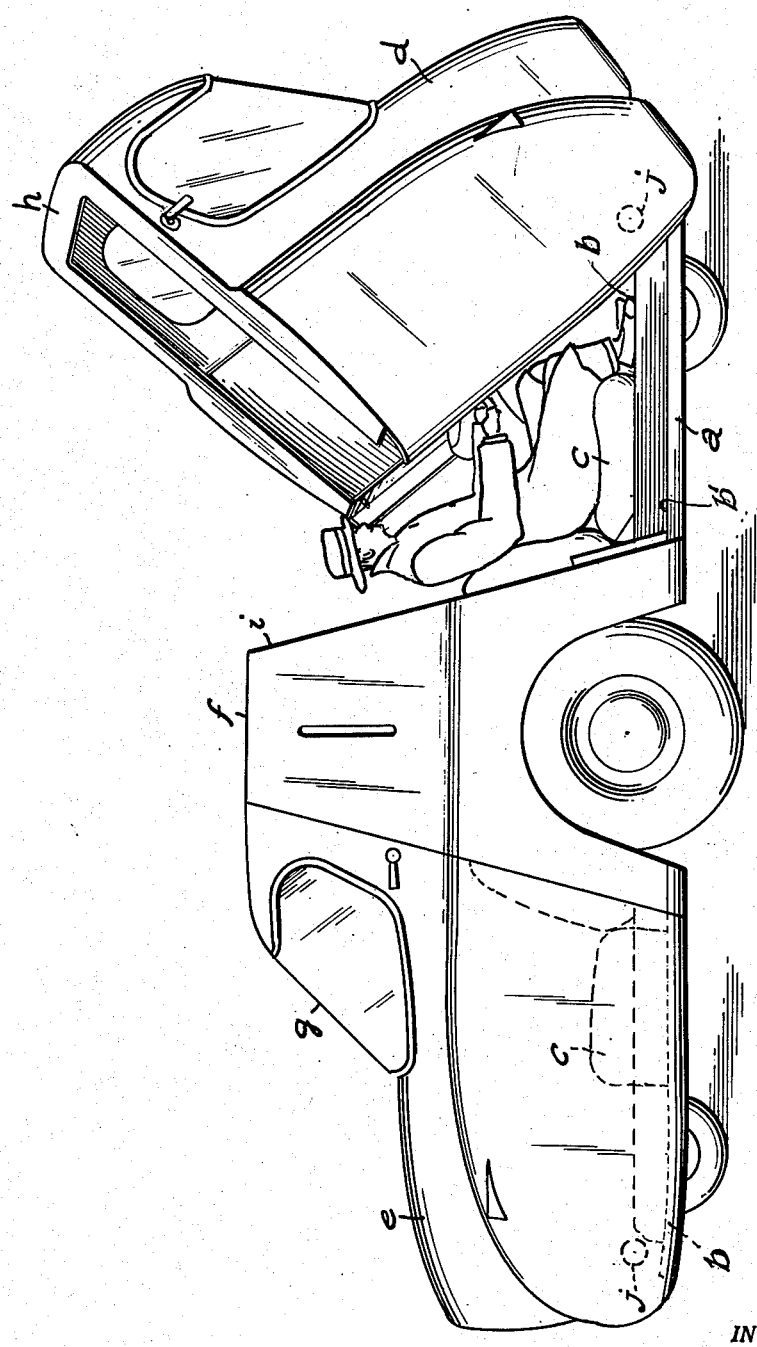
INVENTOR.
M. A. C. Alamagny
BY
ATTORNEYS.

UNITED STATES PATENT OFFICE 2,656,214

AUTOMOBILE BODY HAVING PIVOTED END SECTIONS

Marcel Antoine Clément Alamagny, Saint-Cloud, France

Application October 5, 1945, Serial No. 620,568
In France April 7, 1945

2 Claims. (Cl. 296—28)

The present invention relates to the art of motor vehicles and more particularly relates to a body construction therefor.

Specifically the invention relates to an automobile body construction of unusual design and appearance and one which is ideally suitable for utilization in connection with a motor vehicle of low selling price, low operating cost and one which gives a unique and pleasing appearance.

The invention more specifically relates to an automobile body construction providing a minimum of components which constitute the body.

It is therefore an object of the invention to provide in a motor vehicle a body construction which eliminates conventional doors incorporated in motor vehicles yet permits of quick and ready access to the seating arrangement of the vehicle.

It is an additional object to provide in a motor vehicle a body construction in which the vehicle includes opposite ends at least one end of which is cut away along substantially vertical and horizontal planes thus providing a nose portion that is open at the top, front and sides, the horizontal plane of this nose portion accommodating at least one seat with its back at least adjacent the aforementioned vertical plane and an enclosure for the seats comprising a cover member movable between open and closed positions and in open position exposing the seats so as to provide unimpeded lateral access thereto from either side of the vehicle.

Specifically it is an object of this invention to provide a body construction for a vehicle including a chassis having opposite ends, a floor, seats carried by the floor, a fixed body portion disposed centrally of the chassis and including opposite marginal edges, and two oppositely facing shell-like body members pivotally connected to the chassis at the opposite ends thereof at positions remote from the seats and said body members being movable between open and closed positions and in closed positions the inner marginal edges of the body members abutting the opposite edges of the centrally disposed fixed body portion.

It is a further and more specific object to provide in such a body construction inclined marginal edges on the fixed body portion with the inclination of the opposite edges converging upwardly and correspondingly inclined marginal edges on the respective shell-like body members.

Further and more specific objects will be apparent in the accompanying drawing illustrating a form of the invention.

The drawing illustrates a vehicle having a wheel base of the type also illustrated in my prior Patent 2,533,752 issued December 12, 1950 in which the wheels have different sizes and include fore and aft longitudinally aligned end wheels of smaller diameter than the larger wheels situated at the sides close to the transverse median plane of the vehicle.

This is the illustrated embodiment and it is obvious that any desired wheel base arrangement can be embodied with the present invention.

The chassis indicated at $a$ includes suitable frame members and may be of the type embodied in the above mentioned patent. The frame either includes as an integral portion thereof or suitably supports a floor denoted generally at $b$. In the illustrated embodiment oppositely facing seats $c$ are supported by the floor and two oppositely facing shell-like body members $d$ and $e$ are pivotally connected to the chassis adjacent the opposite ends of the latter by the transversely extending pivot means denoted at $j$. At the central portion of the body of the chassis an upstanding fixed body portion $f$ is provided. This fixed body portion includes opposite marginal edges $i$ which in the illustration are inclined in such fashion that the inclination of the respective opposite edges converges upwardly. The marginal edges $h$ of the respective shell-like body members are similarly inclined and each of the body members includes a window or windshield portion $g$ providing for visibility.

The body members are illustrated in the drawing in such fashion that the body member $e$ is in closed position and the body member $d$ is swung upwardly about the pivot means $j$ to an open position. It is clear therefore that this construction provides unimpeded lateral access to the seats from either side of the vehicle.

With the present invention it is thereby possible to provide a vehicle of extremely low overall height since the occupant merely has to swing his feet laterally and rest them on the ground for arising.

The floor includes a marginal portion $b'$ upon which abuts the lower portion of the shell-like body members in closed position.

In connection with this vehicle the pivotally mounted hood-like body members carry the light accessories such as the windshield wiper, head lamps, horns, grills, license plates and the like while the chassis proper includes the floor, the seats, the various suspension means, and the chassis likewise supporting the engine.

Suitable gaskets or other sealing means not illustrated are provided between the floor and the edges of the upstanding fixed body portion $f$ and the adjacent surfaces of the displaceable body members so as to provide a tight joint between the so-called fixed body and the respective displaceable body portions.

It is therefore clear that the present invention provides a unique body construction in a chassis having opposite ends at least one end of which constitutes a nose section, so to speak, which is cut away along a substantially horizontal plane and a substantially vertical plane so that it provides a seating compartment that will therefore be open at the top, front and the sides. At least one seat is provided in this compartment resting on the floor but with the seating surface above the level of the horizontal plane and a movable hood-like body member that is movable between open and closed positions and which incorporates front, top and side sections having a window in at least the front section and which front, top and side sections fit the space between the substantially vertical and substantially horizontal planes. The movable body section has edges which in closed position are at least adjacent said planes and pivot means are provided pivotally connecting said hood-like body member to the chassis of the vehicle.

As shown in the drawing, the chassis includes a fixed body portion that is disposed in spaced relation with respect to each of the ends and the seats are in inward spaced relation with respect to the pivot means. The pivots are remote from the seats and thus the hood-like body members move away from the seats in an upward and outward direction exposing the seats and floor to immediate unimpeded access from opposite sides of the vehicle.

Suitable latch means, not shown, are provided which secure the hoods in closed position and which latch means are obviously operable from the inside as well as from the outside.

In connection with the preferred embodiment illustrated the fixed body portion $f$ obviously will provide a strong vertical brace so as to minimize damage in the event of the vehicle overturning.

It is further clear therefore that the invention provides a body structure embodying minimum parts and in the example illustrated only three body sections are present, namely the opposite pivotally mounted end sections $d$ and $e$ and the centrally disposed fixed upstanding section $f$.

In connection with this improved body construction it is to be noted that the movable hood-like members include lower edges which in closed position abut the lateral portions of the floor of the vehicle outwardly of the fixed body portion. Of course if desired suitable gasket means are provided between these abutting portions so as to form an effective seal.

The pivot means embodied form no part of this invention other than being a component of the combination and any suitable hinge means can be utilized so long as they provide for swinging of the hood-like body members from a lower closed position to an upper open position.

It is also to be noted that while the drawing illustrates an arrangement in which the upstanding fixed body portion $f$ is provided with oppositely inclined marginal edges the invention can be embodied in a vehicle of the type illustrated in which the opposite edges $i$ of the fixed body portion are disposed absolutely vertical as distinguished from an inclination.

Further, while the illustrated embodiment relates to a pleasure vehicle it is believed clear that the invention is applicable to a commercial vehicle in which the portion to the rear of the driver constitutes a carrying compartment such as a panel truck body.

Having now described my invention what it is desired to be secured by U. S. Letters Patent is:

1. In a vehicle, a chassis having opposite ends, a floor, seats carried by the floor, a fixed body portion disposed centrally of the chassis and including opposite marginal edges, two oppositely facing shell-like body members each including a lower marginal portion, an outer end, sides, top and inner marginal edges and each having at least one window therein, transverse pivots at the opposite ends of the chassis pivotally interconnecting the body members to the chassis adjacent the lower marginal portions at the respective ends of the body members so that in closed position the lower marginal portions along the sides of each body member abut the floor outwardly of the fixed body portion and the respective inner marginal edges of each body member abutting the opposite marginal edges of the fixed body portion, the said body members being swingable upwardly relative to the floor away from each other and about the transverse pivots to expose the floor and seats so as to provide unimpeded access to the seats.

2. In a vehicle as defined in and by claim 1, and in which in closed position the planes containing the abutting edges of the fixed body portion and the body members converge upwardly.

MARCEL ANTOINE CLÉMENT ALAMAGNY.

References Cited in the file of this patent

UNITED STATES PATENTS

| Number | Name | Date |
|---|---|---|
| 970,238 | Kerstetter | Sept. 13, 1910 |
| 1,681,062 | Sparshatt | Aug. 14, 1928 |
| 1,819,545 | Delp | Aug. 18, 1931 |
| 1,852,464 | Leipert | Apr. 5, 1932 |
| 1,868,382 | Coadou | July 19, 1932 |
| 1,989,995 | Martin | Feb. 5, 1935 |
| 2,089,496 | Liber | Aug. 10, 1937 |
| 2,141,267 | Dillon | Dec. 27, 1938 |
| 2,148,308 | Spear | Feb. 21, 1939 |
| 2,203,477 | Wahlberg | June 4, 1940 |
| 2,324,508 | Johnson | July 20, 1943 |
| 2,425,948 | Lucien | Aug. 19, 1947 |
| 2,533,548 | Backer | Dec. 12, 1950 |

FOREIGN PATENTS

| Number | Country | Date |
|---|---|---|
| 427,454 | Great Britain | Apr. 24, 1935 |
| 851,910 | France | Oct. 16, 1939 |
| 859,864 | France | Sept. 20, 1940 |
| 872,026 | France | Jan. 29, 1942 |